US012696170B2

(12) United States Patent
Henry et al.

(10) Patent No.: US 12,696,170 B2
(45) Date of Patent: Jul. 28, 2026

(54) TRAFFIC-BASED TUNNEL ENDPOINT ASSIGNMENT FOR LOCAL AREA NETWORKS

(71) Applicant: Cisco Technology, Inc., San Jose, CA (US)

(72) Inventors: Jerome Henry, Pittsboro, NC (US); Robert Edgar Barton, Richmond (CA); Indermeet Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 451 days.

(21) Appl. No.: 18/198,635

(22) Filed: May 17, 2023

(65) Prior Publication Data

US 2024/0388996 A1    Nov. 21, 2024

(51) Int. Cl.
*H04W 40/24* (2009.01)

(52) U.S. Cl.
CPC ................................. *H04W 40/246* (2013.01)

(58) Field of Classification Search
CPC ... H04W 40/246; H04W 76/12; H04W 76/22; H04L 12/4633; H04L 63/029
See application file for complete search history.

(56) References Cited

U.S. PATENT DOCUMENTS

| | | | |
|---|---|---|---|
| 10,764,244 B1 | 9/2020 | Mestery et al. | |
| 2008/0304456 A1* | 12/2008 | Iino | H04L 12/2856 |
| | | | 370/338 |

| | | | |
|---|---|---|---|
| 2014/0056130 A1* | 2/2014 | Grayson | H04W 76/12 |
| | | | 370/230 |
| 2014/0068750 A1* | 3/2014 | Tjahjono | H04L 63/029 |
| | | | 726/15 |
| 2014/0269564 A1* | 9/2014 | Tie | H04W 76/12 |
| | | | 370/329 |
| 2015/0063158 A1* | 3/2015 | Nedeltchev | H04W 76/00 |
| | | | 370/253 |

(Continued)

FOREIGN PATENT DOCUMENTS

WO    WO2022007749    1/2022

OTHER PUBLICATIONS

CAPWAP Protocol (IPCisco.com), retrieved Oct. 30, 2025 (Year: 2023).*

(Continued)

*Primary Examiner* — Andrew W Chriss
(74) *Attorney, Agent, or Firm* — Lee & Hayes, P.C.

(57) ABSTRACT

A network function orchestrator (NFO) of a local area network (LAN) controller can configure multiple different tunnel endpoints in the LAN based on network traffic observed within the LAN. The NFO can monitor network traffic communicated from client devices and through access points in the LAN. The network traffic can be associated with multiple different destinations. The NFO can determine, based on the network traffic and using network topology data, network devices to serve as tunnel endpoints within the LAN. Different tunnel endpoints can be configured for use in connection with different traffic destinations. The NFO can communicate with the network devices and the access points to configure the LAN to use the different tunnel endpoints.

20 Claims, 9 Drawing Sheets

(56)     References Cited

U.S. PATENT DOCUMENTS

| | | | |
|---|---|---|---|
| 2016/0113006 A1* | 4/2016 | Murphy | H04W 76/12 |
| | | | 370/338 |
| 2016/0255050 A1* | 9/2016 | Grayson | H04L 63/1433 |
| | | | 726/1 |
| 2018/0007721 A1* | 1/2018 | Fu | H04W 24/02 |
| 2019/0081931 A1* | 3/2019 | Slutsker | H04W 76/12 |
| 2020/0177503 A1 | 6/2020 | Hooda et al. | |
| 2020/0358878 A1 | 11/2020 | Bansal et al. | |
| 2022/0116806 A1 | 4/2022 | Sundararajan et al. | |

OTHER PUBLICATIONS

Technical Tip: External DHCP server with FortiAP and FortiGate wireless controller (Fortinet.com), retrieved Oct. 30, 2025 (Year: 2017).*

* cited by examiner

800

900

RECEIVE TUNNEL ENDPOINT CONFIGURATION DATA
902

APPLY TUNNEL ENDPOINT CONFIGURATION DATA
904

RECEIVE TUNNEL TRAFFIC
906

APPLY TUNNEL POLICIES
908

FORWARD TUNNEL TRAFFIC TO TUNNEL DESTINATION
910

TRAFFIC-BASED TUNNEL ENDPOINT ASSIGNMENT FOR LOCAL AREA NETWORKS

TECHNICAL FIELD

The present disclosure relates generally to network management, and more particularly, to configuring local area networks (LANs) to orchestrate network traffic flows.

BACKGROUND

In controller-based LAN architectures, network traffic typically flows from client devices to access points, and from the access points to a LAN controller. The LAN controller applies LAN policies and forwards the traffic towards upstream destinations. The connection between the access points and the LAN controller can be configured as a tunnel, for example, as a "control and provisioning of wireless access points" (CAPWAP) tunnel.

There is value in using a tunnel to connect the access points and the LAN controller. The tunnel offers a point of security enforcement, allows protection (e.g., encryption) of data in transit to the LAN controller, and offers segmentation of traffic that would otherwise be difficult to accomplish.

However, connecting the access points and the LAN controller via a tunnel does not necessarily scale well and becomes particularly difficult if the LAN controller is moved to a cloud. For example, large networks can contain thousands of access points or more, all managed from a central site (e.g., one building on a campus), and sending all network traffic there causes congestion issues and packet back-and-forth trips. If the LAN controller is moved to the cloud, then all LAN traffic is forced to transit a tunnel to the cloud, regardless of the traffic's destination. This outcome is impractical at best and may be impossible in some circumstances.

In view of the foregoing, there is a need for solutions that retain the advantages of tunnel connections for LAN network traffic, while also scaling to meet the needs of large LANs with high traffic flows and supporting the option of moving the LAN controller to the cloud.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
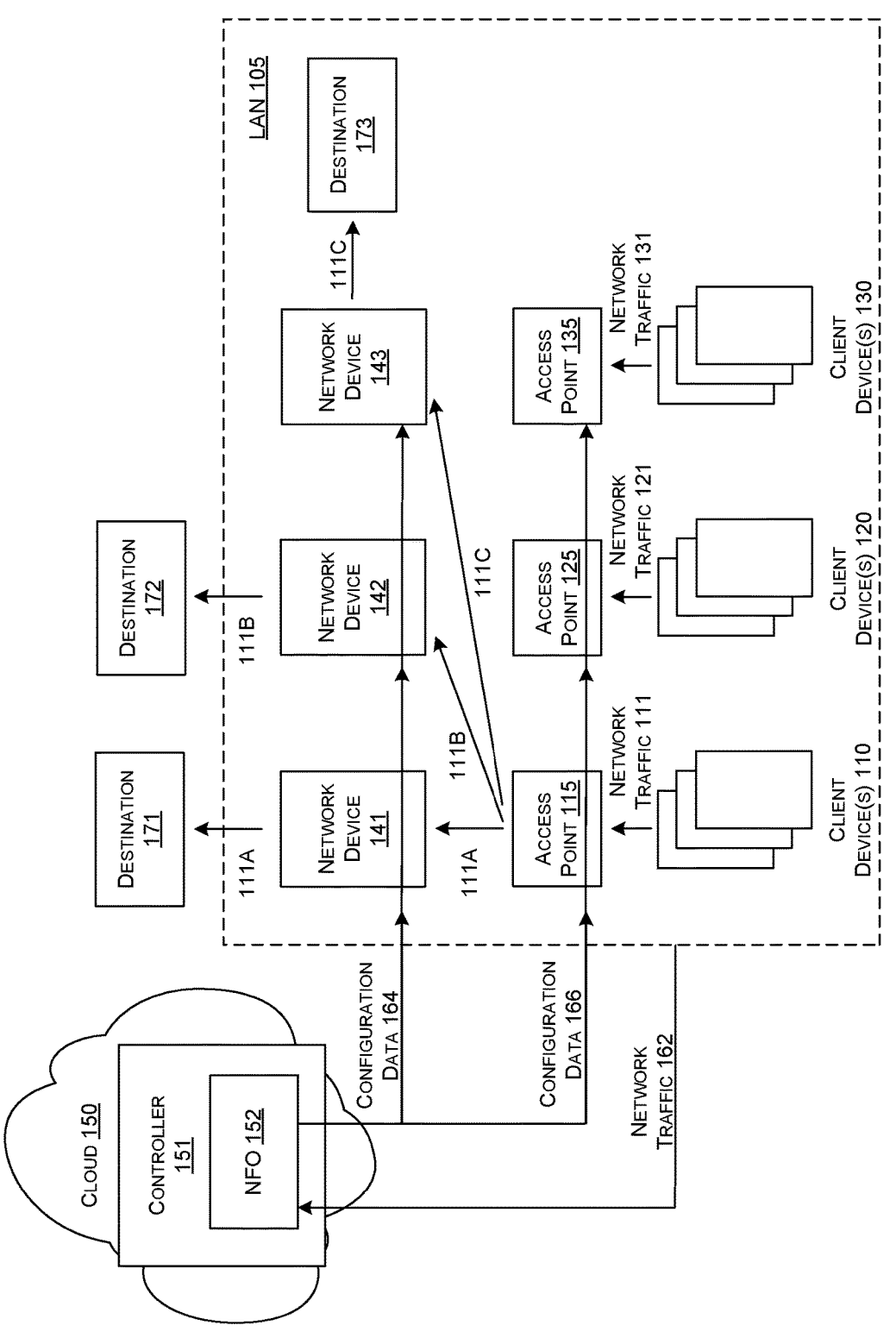
FIG. 1 illustrates a LAN comprising client devices, access points, and network devices, wherein the network devices can be configured by a network function orchestrator (NFO) to serve as tunnel endpoints, in accordance with various aspects of the technologies disclosed herein.

This disclosure describes method(s) for configuring multiple different tunnel endpoints in a LAN, based on the network traffic observed within the LAN. In some examples, the method(s) can be performed at least partly by a network function orchestrator (NFO) within a LAN controller. Example methods can include monitoring network traffic communicated from client devices and through access points in a LAN, wherein the network traffic comprises multiple different destinations, and determining, based at least in part on the monitoring, the multiple different destinations. Example methods can furthermore include receiving network topology data indicating a topology of network devices in the LAN, and determining, using the network topology data, a first network device within the LAN to serve as a first tunnel endpoint and a second network device within the LAN to serve as a second tunnel endpoint. Example methods can furthermore include communicating with the first network device to configure the first network device to act as the first tunnel endpoint and communicating with the second network device to configure the second network device to act as the second tunnel endpoint. The first tunnel endpoint can be adapted to: receive first network traffic via first tunnels from the access points, wherein the first network traffic is destined to a first destination of the multiple different destinations, and forward the first network traffic to the first destination. The second tunnel endpoint can be adapted to: receive second traffic via second tunnels from the access points, wherein the second network traffic is destined to a second destination of the multiple different destinations, and forward the second network traffic to the second destination. Example methods can furthermore include providing the first network device with first policies to apply to the first network traffic received via the first tunnels, and providing the second network device with second policies to apply to the second network traffic received via the second tunnels.

Additionally, the techniques described herein may be performed by a system and/or device having non-transitory computer-readable media storing computer-executable instructions that, when executed by one or more processors, performs the method described above.

Example Embodiments

The techniques described herein enable an NFO associated with a LAN controller to configure multiple different tunnel endpoints in a LAN based on network traffic observed within the LAN. The NFO can monitor network traffic communicated from client devices and through access points in the LAN. The network traffic can be associated with multiple different destinations. The NFO can determine, based on the network traffic and using network topology data, network devices to serve as tunnel endpoints within the LAN. Different tunnel endpoints can be configured for use in connection with different traffic destinations. The NFO can communicate with the network devices and the access points to configure the LAN to use the different tunnel endpoints.

In an example, an NFO can monitor network traffic that is processed within a LAN in an initial learning stage, and the NFO can determine tunnel endpoint locations within the LAN based on information gathered pursuant to the traffic monitoring. For example, the NFO may observe that network traffic goes to a number of different main destinations, and that the LAN has network equipment that is well suited, e.g., by its position within the LAN, to forward traffic to the main destinations.

The NFO can determine, based on properties/destinations of the network traffic, the topology of the LAN, and various other factors described herein, different network devices within the LAN to serve as tunnel endpoints for network traffic that is associated with the different destinations.

Once tunnel endpoints are selected, the NFO, or other LAN equipment, can generate configuration data that can be used by access points within the LAN to send network traffic via selected tunnels to selected tunnel endpoints. Each access point can observe destinations of network traffic, and then use the configuration data to forward network traffic via a tunnel that is associated with its destination.

In a configuration stage, the NFO can configure the different network devices to serve as tunnel endpoints for network traffic that is associated with the different destinations, and the NFO can also configure access points. The NFO can furthermore determine and deploy to the tunnel endpoints various policies to be enforced at the tunnel endpoints.

Upon configuration of the LAN, the access points can process network traffic received from client devices by determining the destinations of the network traffic. The access points can then forward the network traffic via a selected tunnel and to a corresponding tunnel endpoint based on the traffic's destination. The network devices which are configured as different tunnel endpoints can implement different tunnels, receive network traffic via the different tunnels, apply policies applicable to the traffic destination, and forward received network traffic to respective destinations for which the different respective tunnel endpoints are configured.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a LAN 105 comprising client devices 110, 120, 130, access points 115, 125, 135, and network devices 141, 142, 143, wherein the network devices 141, 142, 143 can be configured by NFO 152 to serve as tunnel endpoints, in accordance with various aspects of the technologies disclosed herein. In the illustrated embodiment, the NFO 152 is part of a controller 151, e.g., a LAN controller for LAN 105, wherein the controller 151 and NFO 152 are implemented in a cloud 150 that is remote from the LAN 105. FIG. 1 also illustrates various different destinations 171, 172, 173 for network traffic originating at the client devices 110, 120, 130. Destinations 171 and 172 are outside of the LAN 105, while destination 173 is an example destination within the LAN 105.

In an example according to FIG. 1, the NFO 152 can monitor network traffic 162 that is processed within the LAN 105. In an initial learning stage, the network traffic 162 can include network traffic that is processed by the various different elements of the LAN 105, e.g., by the access points 115, 125, 135, and by the network devices 141, 142, 143, prior to processing network traffic 111, 121, and 131. During a subsequent refinement stage, the monitored network traffic 162 can include the network traffic 111, 121, and 131.

The NFO 152 can determine, based on properties of the network traffic 162, the topology of the LAN 105, the destinations 171, 172, and 173 of the network traffic 162, and various other factors described herein, different network devices 141, 142, 143 within the LAN 105 to serve as tunnel endpoints for network traffic that is associated with the different destinations 171, 172, and 173. The NFO 152 can then configure, via configuration data 164, the different network devices 141, 142, 143 to serve as tunnel endpoints for network traffic that is associated with the different destinations 171, 172, and 173.

For example, the NFO 152 can configure the network device 141 to serve as a tunnel endpoint for network traffic that is associated with the destination 171. The NFO 152 can configure the network device 142 to serve as a tunnel endpoint for network traffic that is associated with the destination 172. The NFO 152 can configure the network device 143 to serve as a tunnel endpoint for network traffic that is associated with the destination 173. Further network devices, not illustrated in FIG. 1, can be configured to serve as tunnel endpoints for further destinations. Also, some network devices in the LAN 105 need not be configured as tunnel endpoints.

The NFO 152 can further configure, via configuration data 166, the access points 115, 125, 135 to send network traffic via a selected tunnel to a selected tunnel endpoint, wherein the selected tunnel is selected based on the destination of the network traffic. For example, network traffic 111 can include network traffic 111A which is associated with destination 171, network traffic 111B which is associated with destination 172, and network traffic 111C which is associated with destination 173. The NFO 152 can configure the access point 115 to forward network traffic 111A via a first tunnel to network device 141, wherein the network device 141 is configured to implement the first tunnel and to forward network traffic 111A to destination 171. The NFO 152 can further configure the access point 115 to forward network traffic 111B via a second tunnel to network device 142, wherein the network device 142 is configured to implement the second tunnel and to forward network traffic 111B to destination 172. The NFO 152 can further configure the access point 115 to forward network traffic 111C via a third tunnel to network device 143, wherein the network device 143 is configured to implement the third tunnel and to forward network traffic 111C to destination 173. The NFO 152 can similarly configure access points 125 and 135 to process components of network traffic 121 and 131, respectively.

In summary, the NFO 152 can monitor network traffic 162 and learn/determine, based on the network traffic 162, a network device of the network devices 141, 142, 143 to configure as a tunnel endpoint for each of the destinations 171, 172, 173. The NFO 152 can then configure, via configuration data 164, different network devices 141, 142, 143 to serve as tunnel endpoints for different destinations 171, 172, 173. The NFO 152 can furthermore configure access points 115, 125, 135 to forward network traffic via a tunnel to a tunnel endpoint based on the destination of the network traffic.

Upon configuration, the access points 115, 125, 135 can process received network traffic 111, 121, 131 from client devices 110, 120, 130 by determining the destination of the network traffic 111, 121, 131 and then forwarding the network traffic 111, 121, 131 via a tunnel and to a tunnel endpoint based on destination. The network devices 141, 142, 143 which are configured as different tunnel endpoints can implement different tunnels, receive network traffic 111, 121, 131 via the different tunnels, and forward received network traffic 111, 121, 131 to the respective destinations 171, 172, 173 for which the different respective tunnel endpoints are configured.

In some embodiments, tunnels established in the LAN 105 can comprise "control and provisioning of wireless access points" (CAPWAP) tunnels, and the controller 151 can comprise a wireless LAN controller (WLC). Techniques described herein can dynamically split WLC functions and can position one or more of the resulting individual functions in positions relative to the access points 115, 125, 135 (close or far from the access points 115, 125, 135), based on the network topology of the LAN 105 and network traffic flow patterns within the LAN 105.

In some embodiments, CAPWAP encapsulation can be terminated at different tunnel endpoints based on computations by NFO 152 of more, or most, efficient options for each tunnel endpoint. Embodiments can therefore break the notion of monolithic tunneling, allowing traffic from a given access point 115, 125, 135, and a given service set identifier (SSID) to be sent to different network devices 141, 142, 143, depending on the traffic type and the position of the target destination. In order to serve as tunnel endpoints, network devices 141, 142, 143 (which may also be referred to as switches or routers) do not necessarily need to embed a full scale WLC function, but merely a CAPWAP decapsulation/encapsulation function, along with signaling to the controller 151.

In an aspect, this disclosure presents a method to distribute CAPWAP termination functions across different endpoints of a network such as LAN 105, based on observed network traffic types and flow destinations 171, 172, 173. When the controller 151 is situated in a cloud 150, tunneling traffic to the cloud 150 becomes impractical, while implementing monolithic WLC functions locally within the LAN 105 also creates overhead and complexity. Embodiments of this disclosure can solve these issues by dynamically positioning tunnel termination points to provide increased and/or highest flow efficiency of network traffic while also keeping control options associated with CAPWAP tunneling.

Embodiments can recognize that the functions performed by a controller 151 can be of two types: radio frequency (RF) and Wi-Fi-specific functions such as access point channel and power management and access point to access point handoff and roaming, and general functions such as data forwarding with policing for security or quality of service (QOS), authentication, authorization and accounting (AAA), and dynamic host configuration protocol (DHCP) relay.

Therefore, this disclosure introduces a NFO 152 management entity that connects to the controller 151 and whose role is to position the functions performed by the controller 151 and access points 115, 125, 135 with the goal of reducing/minimizing latency and load on the LAN 105 and reducing/optimizing the compute cost for LAN 105 functions. While the controller 151 and NFO 152 are illustrated in the cloud 150, in some embodiments of this disclosure the controller 151 and NFO 152 can optionally be on-premises with a local connection to the LAN 105.

Some example methods can proceed according to the following example operations. In a first example operation, the NFO 152 can observe network traffic 162, e.g., data traffic sent by each client device of the client devices 110, 120, 130, and the destinations (3 tuple) of the network traffic 162. The NFO 152 can determine optimal positions in the LAN 105 where different tunnel endpoints, e.g., different "CAPWAP aggregator" functions at different network devices 141, 142, 143, could be implemented to minimize back-and-forth traffic (East-West traffic) within the LAN 105. Naturally, many traffic flows can be identified with many destinations 171, 172, 173. Thus, the NFO 152 can first determine the best positions of multiple tunnel endpoints, wherein the positions reduce or minimize transit and back-and-forth traffic for each destination 171, 172, 173 and wherein the positions also adhere to network security policies of the LAN 105.

For example, destination 171 can be the Internet, and traffic that is destined for the Internet (as may be determined from the destination internet protocol (IP) address) may transit a CAPWAP tunnel that terminates at the network device 141, wherein the network device 141 can be, e.g., either at the edge of the LAN 105 (as close as possible to an access point aggregate), in a secure access service edge (SASE) cloud (allowing traffic to the cloud 150 to be protected from view within a CAPWAP tunnel), or at some other place within the LAN 105. On the other hand, destination 172 can be a local application in a home data center, and traffic that is destined for the home data center can have a CAPWAP termination point on a network device 142 that comprises an aggregator near the data center.

In a second example operation, once the NFO 152 determines a group of tunnel endpoints that both adheres to network security policy and minimizes transit traffic, the NFO 152 can deploy configuration data 164 in order to deploy the tunnel endpoints to the LAN 105 as network functions. The network devices 141, 142, 143 configured as tunnel endpoints can be any device type, e.g., aggregation routers, firewalls, or switches. As long as a network device 141, 142, 143 can apply policies and can be modified to include, e.g., an 702.11 header parsing module/function, it can serve as a tunnel endpoint. Multiple tunnel endpoints may be configured and managed by the NFO 152, in contrast with the single CAPWAP termination point used in other wireless networks.

In a third example operation, NFO 152 can next communicate with the controller 151 to configure the CAPWAP termination points and policy routing on the access points 115, 125, 135. Since multiple CAPWAP aggregators are deployed, each access point 115, 125, 135 may communicate with each of the CAPWAP aggregators depending on what type of traffic the access point 115, 125, 135 sees, and the policy generated through the NFO 152. The controller 151 can communicate the configuration data 166 with the access points 115, 125, 135, and can also communicate configuration data 164 to further configure the tunnel endpoints and the correct forwarding policy. For example, when user traffic is received at an access point 115, the access point 115 can examine the destination IP address and apply a matching access control list (ACL) function that directs traffic to a best aggregator device 141, 142, 143, as determined by the NFO 152. Thus, this approach allows the access point 115 to quickly match destination traffic and send it to a selected tunnel endpoint at 141, 142, or 143 without sending all user traffic blindly to a common controller.

In a fourth example operation, the NFO 152 can observe various other types of traffic, such as management traffic including, for example, onboarding traffic (EAP/802.1X, DHCP), and the NFO 152 can find a nearby candidate tunnel endpoint at 141, 142, or 143 that is near corresponding management services, allowing the management traffic to be dropped off in close proximity to corresponding management services. Besides reducing the back and forth or East-West traffic, such a modification increases reliability as less hops are in the path, and reduces delay when a client roams between access points 115, 125, 135.

In a fifth example operation, the NFO 152 may position associated functions (e.g., an authenticator and a DHCP relay) as close to the access points 115, 125, 135 as possible, while simultaneously minimizing the number of deployed authenticators/DHCP relays in the LAN 105. A similar process can be performed for other functions performed by the controller 151. Some functions can remain at the controller 151 and not be delegated to other network devices 141, 142, 143, e.g., functions terminating at the controller 151 such as access point channel and power configuration functions. Other functions, such as individual client key management, can optionally be delegated to the network devices 141, 142, 143 and/or to the access points 115, 125, 135.

Figure 2:
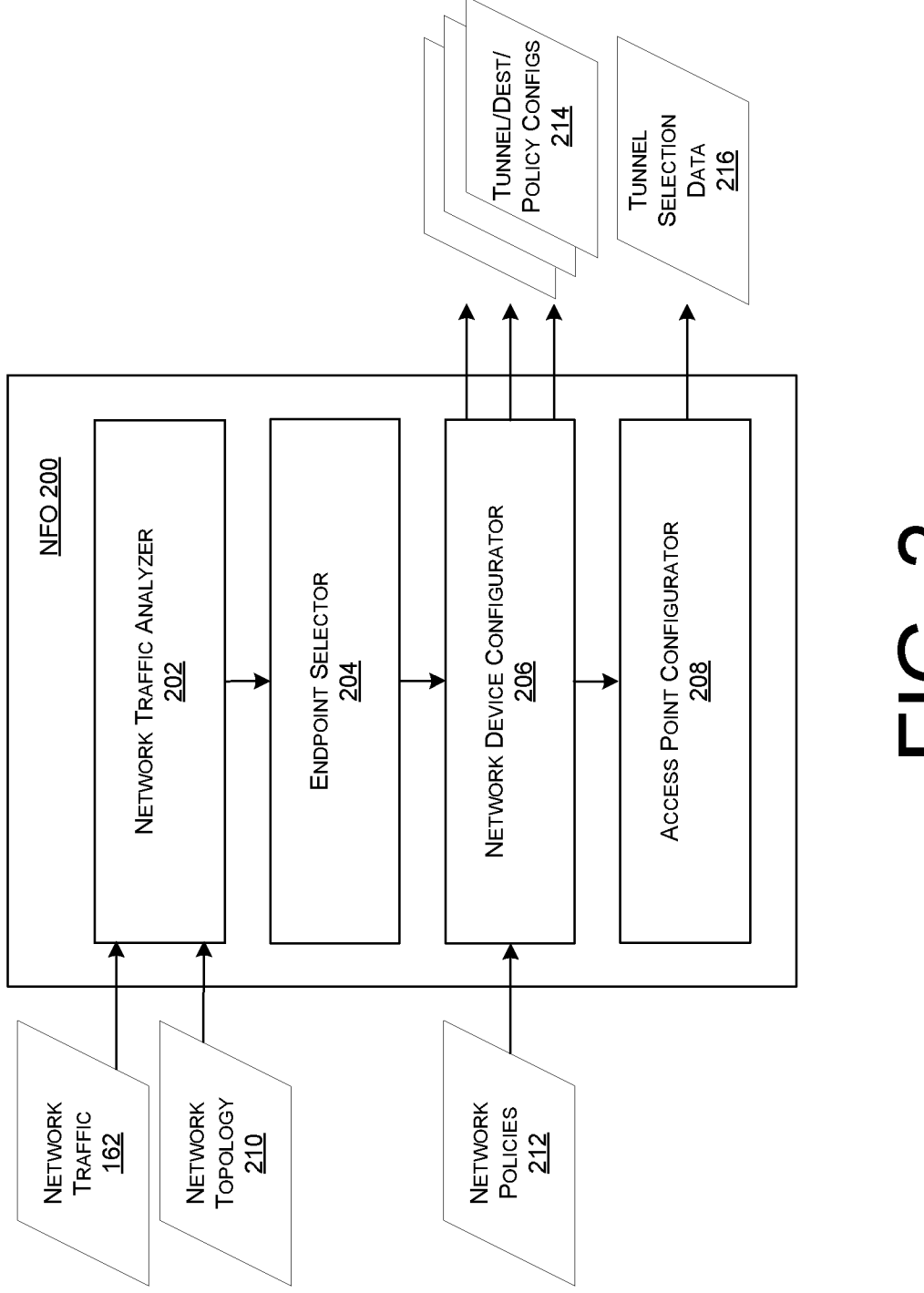
FIG. 2 illustrates an example NFO and components thereof, in accordance with various aspects of the technologies disclosed herein.

FIG. 2 illustrates an example NFO 200 and components thereof, in accordance with various aspects of the technologies disclosed herein. The example NFO 200 can implement the NFO 152 introduced in FIG. 1 in some embodiments. The NFO 200 includes a network traffic analyzer 202, an endpoint selector 204, a network device configurator 206, and an access point configurator 208.

Example operations of the NFO 200 can include using the network traffic analyzer 202 to analyze network traffic 162 and network topology 210, wherein the network topology 210 can include positions devices included in the LAN 105 and connections therebetween. The network traffic analyzer 202 can generate an analyzer output that describes traffic flows within the LAN 105 to different destinations 171, 172, 173. The endpoint selector 204 can then select, based on the analyzer output, network devices such as 141, 142, and 143 to serve as tunnel endpoints for different destinations 171, 172, 173. The endpoint selector 204 can output, e.g., network device 141, 142, 143 selections and corresponding tunnel endpoint identifications, wherein different network devices 141, 142, 143 are associated with different tunnel endpoint identifications for different destinations 171, 172, 173.

The network device configurator 206 can then configure the network devices 141, 142, 143 to serve as tunnel endpoints for different destinations 171, 172, 173, in accordance with the output of the endpoint selector 204. The network device configurator 206 can send different configuration data 164 to different network devices 141, 142, 143. For example, a set of network policies 212 for the LAN 105 can be separated into different policies for different destinations 171, 172, 173. The network device configurator 206 can then send different tunnel, destination, and policy configuration data 214 to the different network devices 141, 142, 143, in order to configure the network devices 141, 142, 143 to serve as tunnel endpoints. In some embodiments, the network device configurator 206 can also optionally place different WLC functions or other network functions at different network devices 141, 142, 143.

Finally, the access point configurator 208 can send tunnel selection data 216 to the access points 115, 125, 135. The tunnel selection data 216 can be included in the configuration data 166 illustrated in FIG. 1. The access points 115, 125, 135 can be configured to use the tunnel selection data 216 to select different tunnels (and corresponding tunnel endpoints) for network traffic associated with different destinations. For example, access point 115, illustrated in FIG. 1, can use tunnel selection data 216 to select a first tunnel for network traffic 111A, thereby directing network traffic 111A to the tunnel endpoint at network device 141, a second tunnel for network traffic 111B, thereby directing network traffic 111B to the tunnel endpoint at network device 142, and a third tunnel for network traffic 111C, thereby directing network traffic 111C to the tunnel endpoint at network device 143. In some embodiments, all of the access points 115, 125, 135 can be sent identical tunnel selection data 216. In other embodiments, access points that do not process network traffic for some destinations, e.g., for destination 171, need not be sent a portion of the tunnel selection data 216 that directs traffic to the corresponding tunnel (e.g., the tunnel to the endpoint at network device 141).

Figure 3:
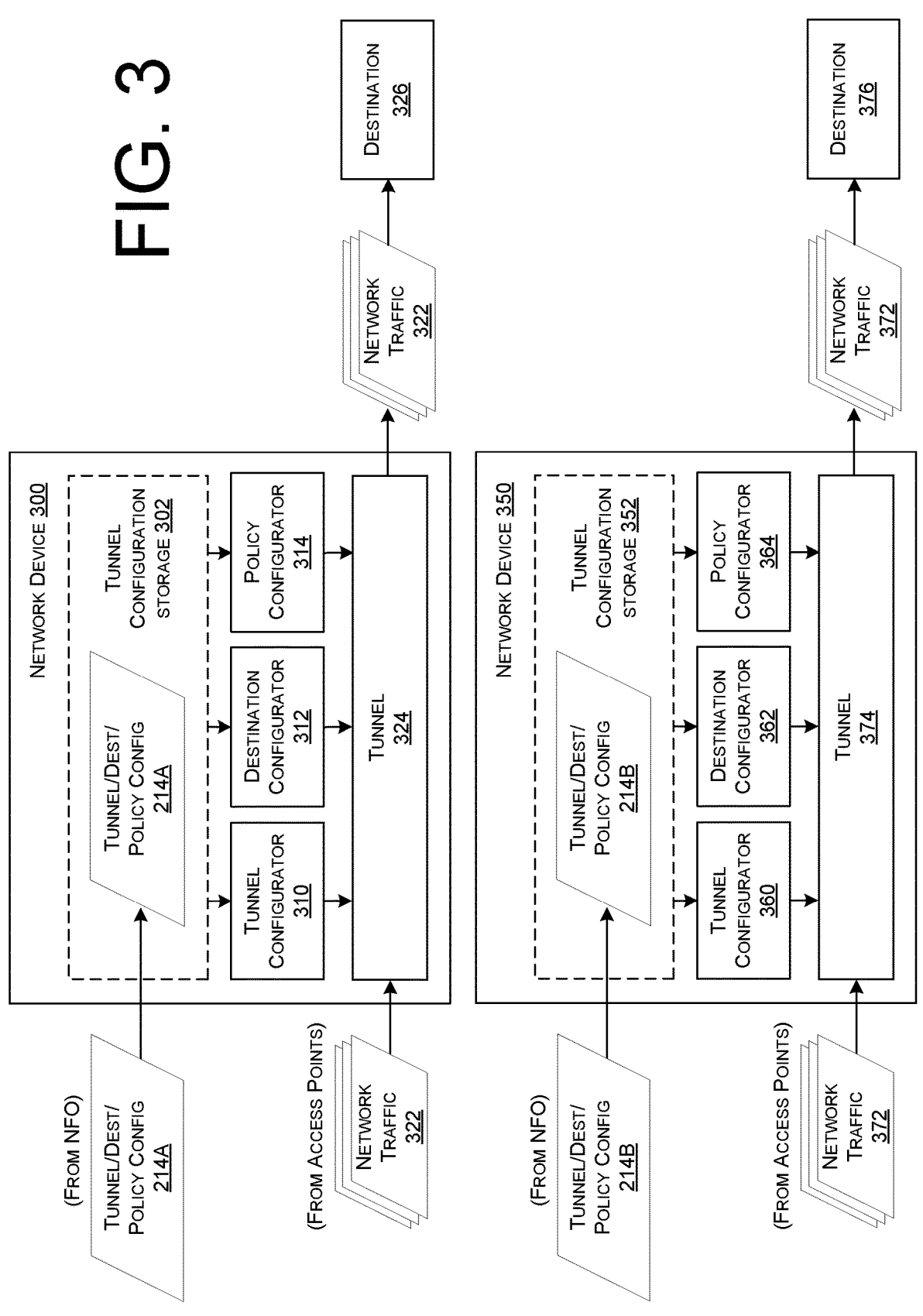
FIG. 3 illustrates example network devices and components thereof, in accordance with various aspects of the technologies disclosed herein.

FIG. 3 illustrates example network devices 300, 350 and components thereof, in accordance with various aspects of the technologies disclosed herein. The example network devices 300, 350 can implement, e.g., any of the network devices 141, 142, 143 introduced in FIG. 1. The network device 300 comprises a tunnel configuration storage 302, a tunnel configurator 310, a destination configurator 312, and a policy configurator 314, and a tunnel 324. The tunnel configuration storage 302 receives and stores a tunnel/destination/policy configuration 214A. The network device 350 comprises a tunnel configuration storage 352, a tunnel configurator 360, a destination configurator 362, and a policy configurator 364, and a tunnel 374. The tunnel configuration storage 352 receives and stores a tunnel/destination/policy configuration 214B.

Example operations of the network device 300 can include, e.g., receiving the tunnel/destination/policy configuration 214A from an NFO, such from the NFO 200 introduced in FIG. 2. The tunnel/destination/policy configuration 214A is a first example instance of the tunnel/destination/policy configuration data 214 illustrated in FIG. 2. The network device 300 can store/install the tunnel/destination/policy configuration 214A in the tunnel configuration storage 302. The tunnel configurator 310, the destination configurator 312, and the policy configurator 314 can be adapted to use the stored tunnel/destination/policy configuration 214A to configure the tunnel 324. The tunnel configurator 310 can configure the tunnel 324 parameters to make the tunnel 324 accessible by access points 115, 125, 135. The destination configurator 312 can configure the tunnel 324 traffic forwarding destination in order forward network traffic 322 received via the tunnel 324 to a destination 326. The policy configurator 314 can configure the tunnel 324 so that policies of the tunnel/destination/policy configuration 214A are applied.

Example operations of the network device 350 can be similar to those of the network device 300, except that a different tunnel/destination/policy configuration 214B is received and applied, and different network traffic 372 is received and forwarded to a different destination 376. The network device 350 can receive the tunnel/destination/ policy configuration 214B from the NFO 200 introduced in FIG. 2. The tunnel/destination/policy configuration 214B is a second example instance of the tunnel/destination/policy configuration data 214 illustrated in FIG. 2. The network device 350 can store/install the tunnel/destination/policy configuration 214B in the tunnel configuration storage 352. The tunnel configurator 360, the destination configurator 362, and the policy configurator 364 can be adapted to use the stored tunnel/destination/policy configuration 214B to configure the tunnel 374. The tunnel configurator 360 can configure the tunnel 374 parameters to make the tunnel 374 accessible by access points 115, 125, 135. The destination configurator 362 can configure the tunnel 374 traffic forwarding destination in order forward network traffic 372 received via the tunnel 374 to a destination 376. The policy configurator 364 can configure the tunnel 374 so that policies of the tunnel/destination/policy configuration 214B are applied.

Figure 4:
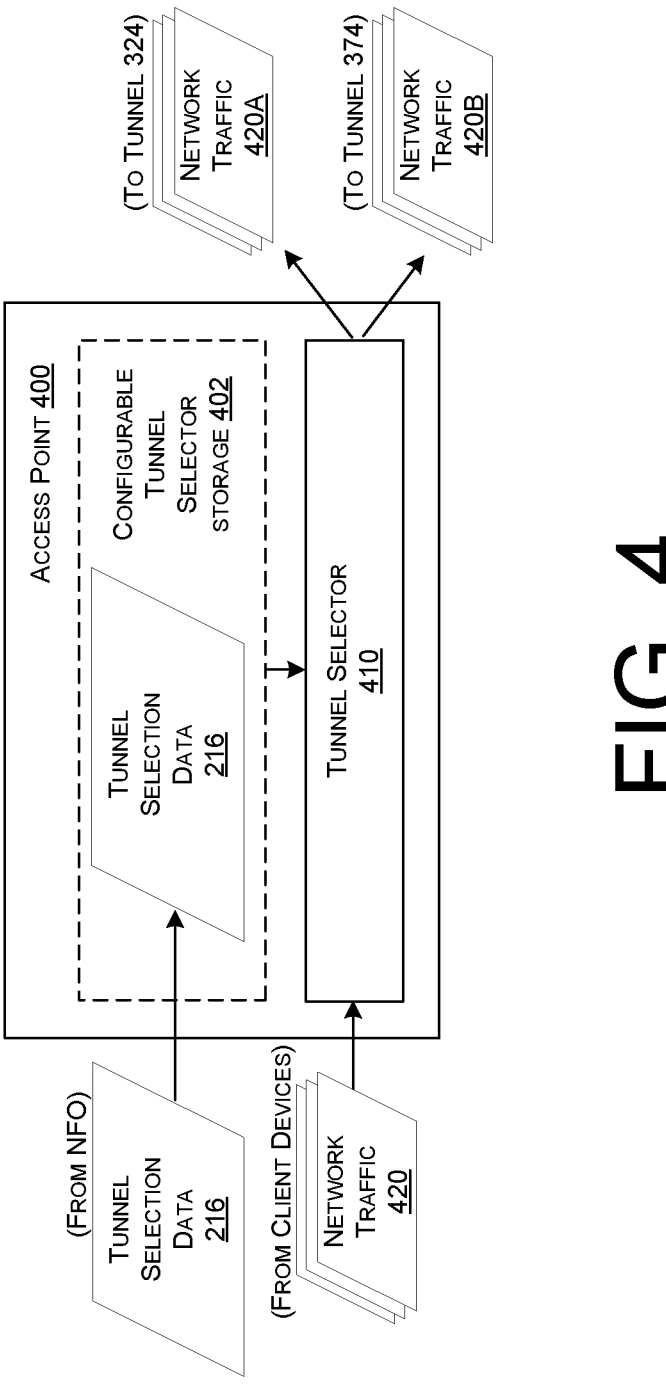
FIG. 4 illustrates an example access point and components thereof, in accordance with various aspects of the technologies disclosed herein.

FIG. 4 illustrates an example access point 400 and components thereof, in accordance with various aspects of the technologies disclosed herein. The example access point 400 can implement, e.g., any of the access points 115, 125, 135 illustrated in FIG. 1. The access point 400 comprises a configurable tunnel selector storage 402 and a tunnel selector 410. The configurable tunnel selector storage 402 can receive and install tunnel selection data 216, e.g., the tunnel selection data 216 generated at the NFO 200 illustrated in FIG. 2.

In an example according to FIG. 2, the access point 400 can be configured to receive network traffic 420, e.g., from the client devices such as client devices 110. The access point 400 can be configured to select different tunnels for different network traffic, based on network traffic destination data, and forward the different network traffic 420 to the different selected tunnels. For example, network traffic 420A can be forwarded to tunnel 324, supported by network device 300 as illustrated in FIG. 3. Network traffic 420B can be forwarded to tunnel 374, supported by network device 350 as illustrated in FIG. 3.

In order to select a tunnel for network traffic, the tunnel selector 410 can be configured to read network traffic destination data, e.g., IP header information. The tunnel selector 410 can look up, in the tunnel selection data 216, tunnels associated with the network traffic destination data. After identifying a tunnel associated with a network traffic destination, the tunnel selector 410 can forward the corresponding network traffic via the identified tunnel.

Figure 5:
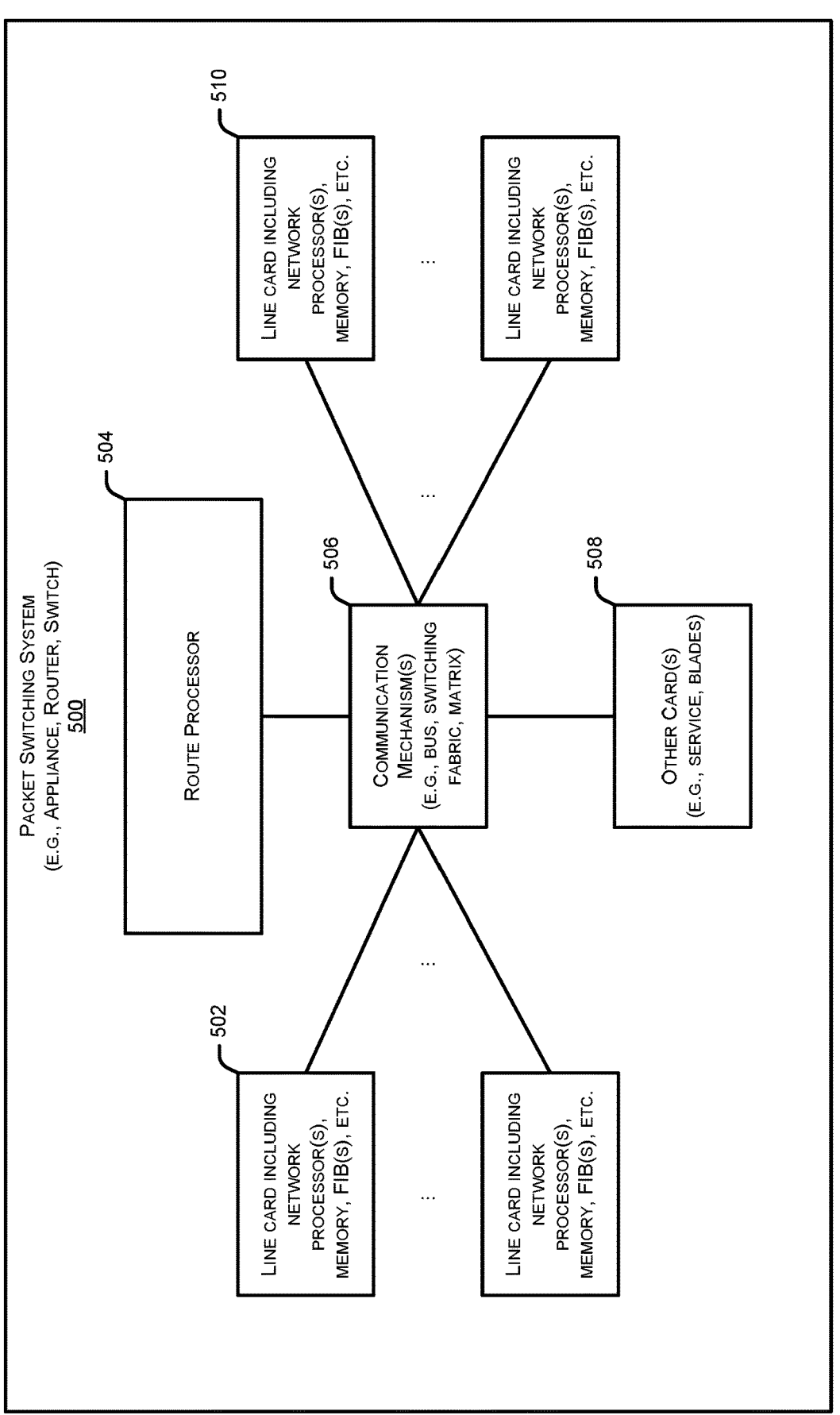
FIG. 5 illustrates an example packet switching system that can be utilized to implement a network device and/or an access point, in accordance with various aspects of the technologies disclosed herein.

FIG. 5 illustrates an example packet switching system 500 that can be utilized to implement a network device and/or an access point, in accordance with various aspects of the technologies disclosed herein. In some examples, the packet switching system 500 can be implemented as one or more packet switching device(s). The packet switching system 500 may be employed in a network, such as, for example, the LAN 105 illustrated in FIG. 1, to process network traffic by receiving and forwarding packets. The illustrated elements of the packet switching system 500 can include, e.g., components introduced in any of FIGS. 2-4 to configure the packet switching system 500 to perform operations according to this disclosure.

In some examples, the packet switching system 500 may comprise multiple line card(s) 502, 510, each with one or more network interfaces for sending and receiving packets over communications links (e.g., possibly part of a link aggregation group). The packet switching system 500 may also have a control plane with one or more processing elements, e.g., the route processor 504 for managing the control plane and/or control plane processing of packets associated with forwarding of packets in a network. The packet switching system 500 may also include other cards 508 (e.g., service cards, blades) which include processing elements that are used to process (e.g., forward/send, drop, manipulate, change, modify, receive, create, duplicate, apply a service) packets associated with forwarding of packets in a network. The packet switching system 500 may comprise a communication mechanism 506 (e.g., bus, switching fabric, and/or matrix, etc.) for allowing the different entities 502, 504, 508 and 510 to communicate. The communication mechanism 506 can optionally be hardware-based. Line card(s) 502, 510 may perform the actions of being both an ingress and/or an egress line card 502, 510, with regard to multiple packets and/or packet streams being received by, or sent from, the packet switching system 500.

Figure 6:
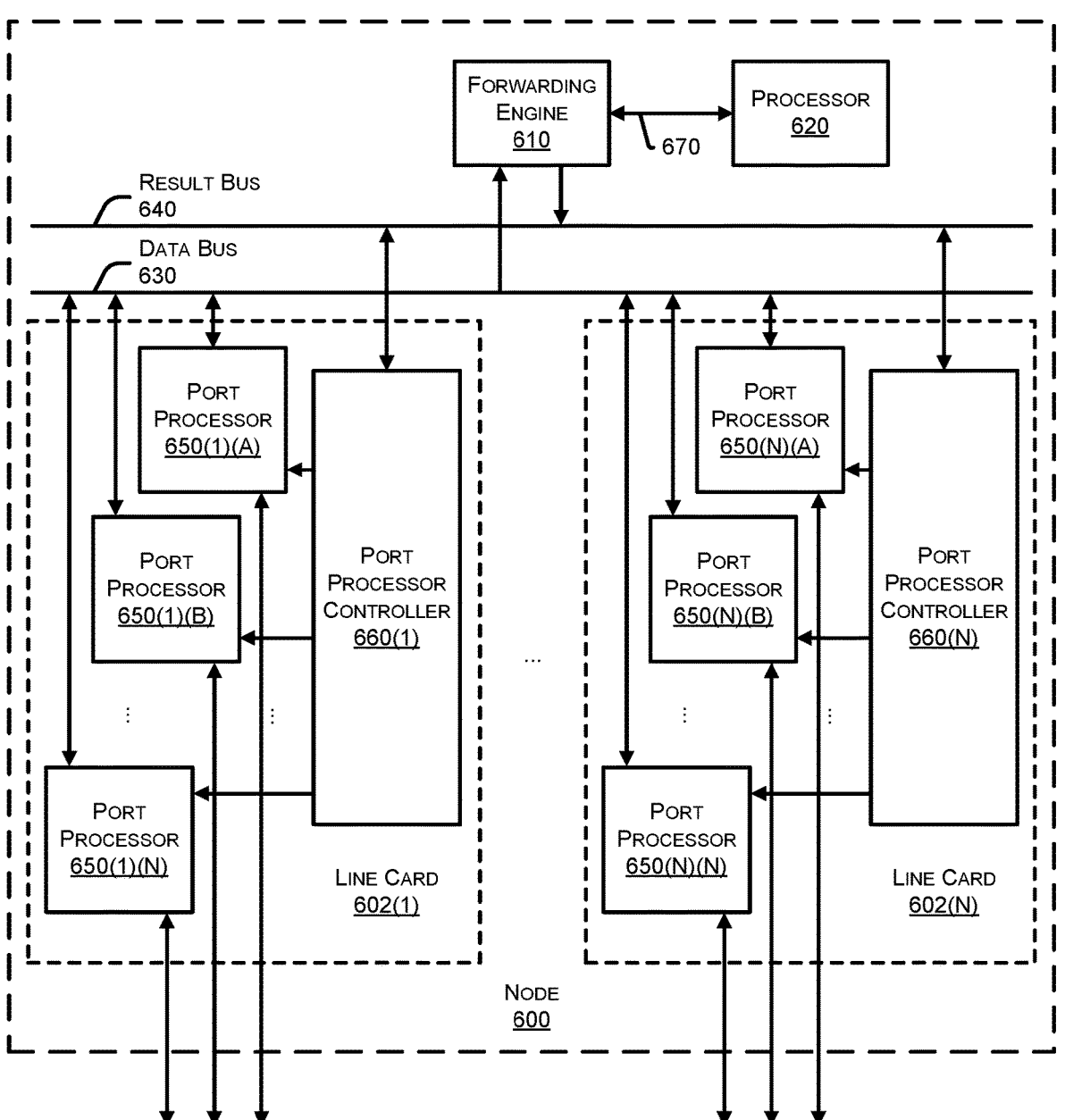
FIG. 6 illustrates an example node and components thereof, wherein the node can be utilized to implement various aspects of the technologies disclosed herein.

FIG. 6 illustrates an example node 600 and components thereof, wherein the node 600 can be utilized to implement various aspects of the technologies disclosed herein. The node 600 can implement, for example, a network device and/or an access point such as illustrated in FIG. 1.

In some examples, node 600 may include any number of line cards 602, e.g., line cards 602(1)-(N), where N may be any integer greater than 1, and wherein the line cards 602 are communicatively coupled to a forwarding engine 610 (also referred to as a packet forwarder) and/or a processor 620 via a data bus 630 and/or a result bus 640. Line cards 602 may include any number of port processors 650, for example, line card 602(1) comprises port processors 650(1)(A)-650(1)(N), and line card 602(N) comprises port processors 650(N)(A)-650(N)(N). The port processors 650 can be controlled by port processor controllers 660, e.g., port processor controllers 660(1), 660(N), respectively. Additionally, or alternatively, the forwarding engine 610 and/or the processor 620 can be coupled to one another via the data bus 630 and the result bus 640, and may also be communicatively coupled to one another by a communications link 670. The processors (e.g., the port processor(s) 650 and/or the port processor controller(s) 660) of each line card 602 may optionally be mounted on a single printed circuit board.

When a packet or packet and header are received, the packet or packet and header may be identified and analyzed by the node 600 in the following manner. Upon receipt, a packet (or some or all of its control information) or packet and header may be sent from one of port processor(s) 650 at which the packet or packet and header was received and to one or more of those devices coupled to the data bus 630 (e.g., others of the port processor(s) 650, the forwarding engine 610 and/or the processor 620). Handling of the packet or packet and header may be determined, for example, by the forwarding engine 610. For example, the forwarding engine 610 may determine that the packet or packet and header should be forwarded to one or more of the other port processors 650. This may be accomplished by indicating to corresponding one(s) of port processor controllers 660 that a copy of the packet or packet and header held in the given one(s) of port processor(s) 650 should be forwarded to the appropriate other one of port processor(s) 650. Additionally, or alternatively, once a packet or packet and header has been identified for processing, the forwarding engine 610, the processor 620, and/or the like may be used to process the packet or packet and header in some manner and/or may add packet security information in order to secure the packet.

On a node 600 sourcing a packet or packet and header, processing may include, for example, encryption of some or all of the packet or packet and header information, the addition of a digital signature, and/or some other information and/or processing capable of securing the packet or packet and header. On a node 600 receiving a packet or packet and header, the processing may be performed to recover or validate the packet or packet and header information that has been secured.

Figure 7:
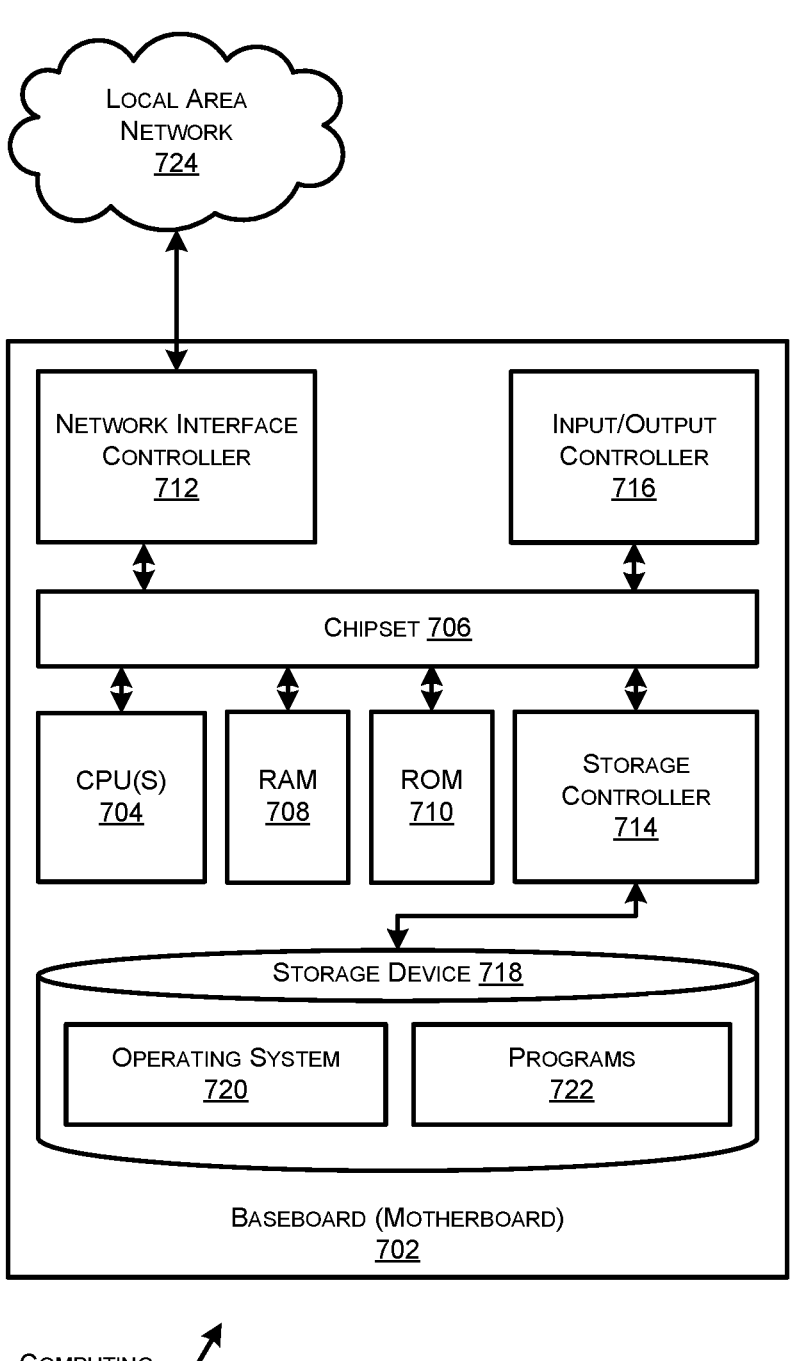
FIG. 7 illustrates an example computing device that can be utilized to implement any of the devices described herein, in accordance with various aspects of the technologies disclosed herein.

FIG. 7 illustrates an example computing device 700 that can be utilized to implement any of the devices described herein, in accordance with various aspects of the technologies disclosed herein. The computer architecture shown in FIG. 7 illustrates a conventional server computer, workstation, desktop computer, laptop, tablet, network appliance, e-reader, smartphone, or other computing device, and can be utilized to execute any of the software components presented herein. The computing device 700 may, in some examples, correspond to a device that host an NFO 200, a network device 300, an access point 400, a packet switching system 500, and/or a node 600 described herein with respect to FIGS. 2, 3, 4, 5, and 6, respectively.

The computing device 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the LAN 724. The chipset 706 can include functionality for providing network connectivity through a NIC 712, such as a gigabit Ethernet adapter. The NIC 712 is capable of connecting the computing device 700 to other computing devices over the network 724. It should be appreciated that multiple NICs 712 can be present in the computing device 700, connecting the computer to other types of networks and remote computer systems.

The computing device 700 can be connected to a storage device 718 that provides non-volatile storage for the computing device 700. The storage device 718 can store an operating system 720, programs 722, and data, to implement any of the various components described in detail herein. The storage device 718 can be connected to the computing device 700 through a storage controller 714 connected to the chipset 706. The storage device 718 can comprise one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computing device 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the storage device 718 by detecting the physical states or characteristics of one or more particular locations within the physical storage units.

In addition to the mass storage device 718 described above, the computing device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 700. In some examples, the operations performed by the computing elements illustrated in FIG. 1, and or any components included therein, may be supported by one or more devices similar to computing device 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computing device 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computing device 700.

In one embodiment, the storage device 718 or other computer-readable storage media is encoded with computer-executable instructions which, when loaded into the computing device 700, transform the computer from a general-purpose computing system into a special-purpose computer capable of implementing the embodiments described herein. These computer-executable instructions transform the computing device 700 by specifying how the CPUs 704 transition between states, as described above. According to one embodiment, the computing device 700 has access to computer-readable storage media storing computer-executable instructions which, when executed by the computing device 700, perform the various processes described above with regard to FIGS. 8-9. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a key board, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

Figure 8:
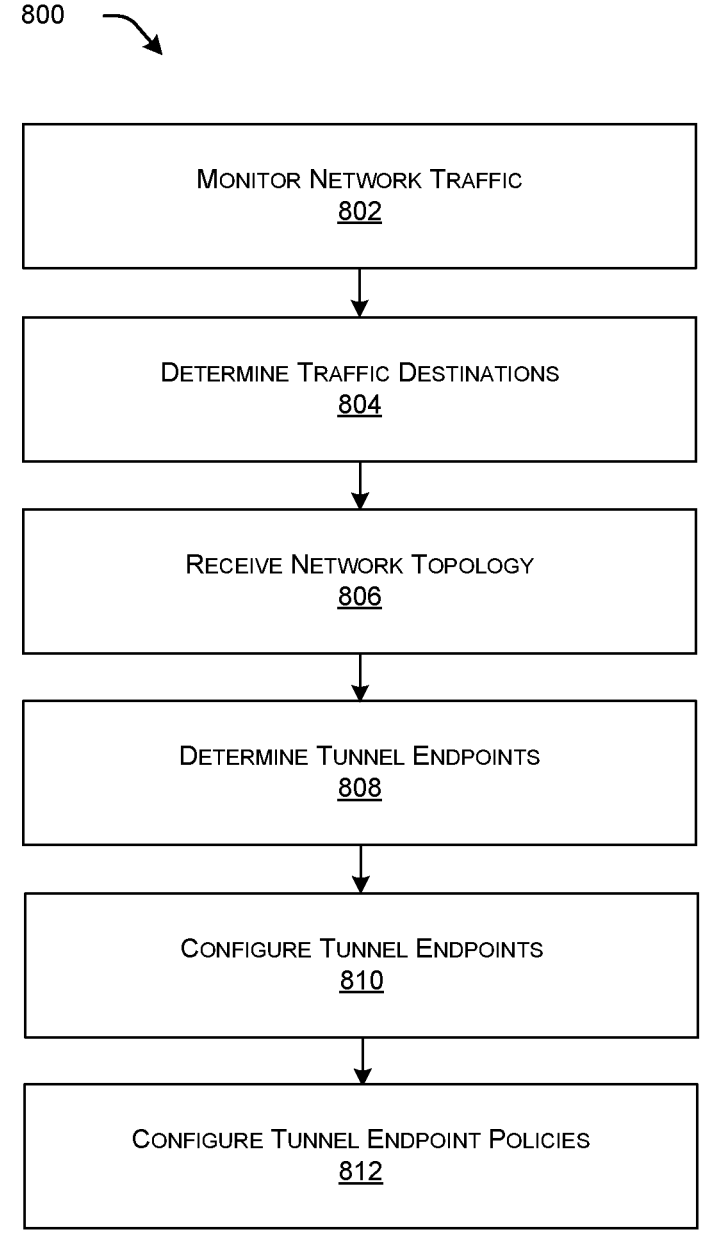
FIG. 8 is a flow diagram that illustrates an example method performed by a NFO, in accordance with various aspects of the technologies disclosed herein.
Figure 9:
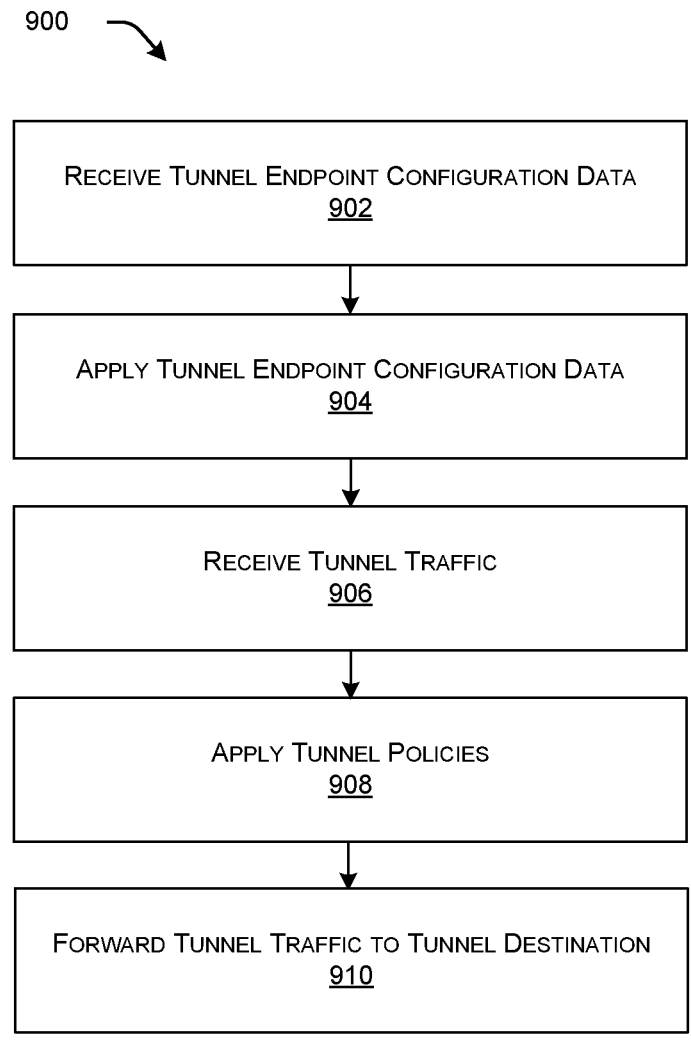
FIG. 9 is a flow diagram that illustrates an example method performed by a network device, in accordance with various aspects of the technologies disclosed herein.

FIGS. 8-9 illustrate flow diagrams of example methods 800, 900 and illustrate aspects of functions performed at least partly by an NFO 152, network devices 141, 142, 143, and access points 115, 125, 135. The logical operations described herein with respect to FIGS. 8-9 may be implemented (1) as a sequence of computer-implemented acts or program modules running on a computing system and/or (2) as interconnected machine logic circuits or circuit modules within the computing system. In some examples, the methods 800, 900 may be performed by a system comprising one or more processors and one or more non-transitory computer-readable media storing computer-executable instructions that, when executed by the one or more processors, cause the one or more processors to perform the methods 800, 900.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 8-9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 8 is a flow diagram that illustrates an example method 800 performed by a NFO 152, in accordance with various aspects of the technologies disclosed herein. The NFO 152 can optionally be located at a location (such as in the cloud 150) that is outside of a LAN 105.

At 802, the NFO 152 can monitor network traffic 162 communicated from client devices 110, 120, 130 and through access points 115, 125, 135 in a LAN 105, wherein the network traffic 162 comprises multiple different destinations, e.g., the destinations 171, 172, 173. At 804, the NFO 152 can determine, based at least in part on the monitoring at operation 802, the multiple different destinations 171, 172, 173 of the network traffic 162. At 806, the NFO 152 can receive network topology data, such as the network topology 210, indicating a topology of network devices in the LAN 105. At 808, the NFO 152 can determine, using the network topology 210, a first network device, e.g., network device 141, within the LAN 105 to serve as a first tunnel endpoint and a second network device, e.g., network device 142, within the LAN to serve as a second tunnel endpoint.

In some embodiments, determining, at 808, the first network device 141 within the LAN 105 to serve as the first tunnel endpoint and the second network device 142 within the LAN 105 to serve as the second tunnel endpoint can be based at least in part on first and second network distances, respectively, wherein the first network distance comprises a network distance between the first network device 141 and the first destination 171, and wherein the second network distance comprises a network distance between the second network device 142 and the second destination 172. For example, network devices selected for use as tunnel endpoints can be network devices that are relatively closer to a corresponding destination.

At 810, the NFO 152 can configure network devices to serve as tunnel endpoints according to the determinations made at operation 808. For example, the NFO 152 can communicate with the first network device 141 to configure the first network device 141 to act as the first tunnel endpoint, and the NFO 152 can communicate with the second network device 142 to configure the second network device 142 to act as the second tunnel endpoint.

Upon configuration at 810, the first tunnel endpoint can thereby be adapted to receive first network traffic 111A via first tunnels from the access points 115, 125, 135, wherein the first network traffic 111A is destined to a first destination 171 of the multiple different destinations 1711, 172, 173. The first tunnel endpoint can forward the first network traffic 111A to the first destination 171.

Similarly, upon configuration at 810, the second tunnel endpoint can thereby be adapted to receive second traffic 111B via second tunnels from the access points 115, 125, 135, wherein the second network traffic 111B is destined to a second destination 172 of the multiple different destinations 171, 172, 173. The second tunnel endpoint can forward the second network traffic 111B to the second destination 172. The first tunnels and the second tunnels can comprise, e.g., CAPWAP tunnels.

The first destination 171 and the second destination 172 can be any different destinations. In one example, one or more of the destinations can comprise, e.g., an authentication server, network traffic directed to the authentication server can comprise authentication traffic, and a tunnel endpoint can be adapted to receive the authentication traffic and forward the authentication traffic to the authentication server. In another example, one or more of the destinations can comprise, e.g., a dynamic host control protocol (DHCP) server, network traffic directed to the DHCP server can comprise DHCP traffic, and a tunnel endpoint can be adapted to receive the DHCP traffic and forward the DHCP traffic to the DHCP server. In another example, one or more of the destinations can comprise, e.g., a public internet destination accessible via the public internet, a local destination (e.g., destination 173) within the LAN 105, or a private data center location within a private data center.

At 812, the NFO 152 can configure tunnel endpoint policies. For example, the NFO 152 can determine first policies to apply to the first network traffic 111A, wherein the first policies comprise a first portion of network policies 212 applicable to network traffic, and wherein the first portion of the network policies is applicable to the first destination 171. The NFO 152 can provide the first network device 141 with the first policies to apply to the first network traffic 111A received via the first tunnels.

Similarly, the NFO 152 can determine second policies to apply to the second network traffic 111B, wherein the second policies comprise a second portion of network policies 212 applicable to network traffic, and wherein the second portion of the network policies is applicable to the second destination 172. The NFO 152 can provide the second network device 142 with second policies to apply to the second network traffic 111B received via the second tunnels.

FIG. 9 is a flow diagram that illustrates an example method 900 performed by network devices, e.g., network devices 300 and 350, in accordance with various aspects of the technologies disclosed herein. In some embodiments, a first network device 300 can be associated with a first network distance to a first destination 326 and a second network distance to a second destination 376, while a second network device 350 can be associated with a third network distance to the first destination 326 and a fourth network distance to the second destination 376. The first network distance can be shorter than the third network distance, and the fourth network distance can be shorter than the second network distance—in other words the first network device 300 is closer to destination 326 than it is to destination 376, and the second network device 350 is closer to destination 376 than it is to destination 326, and the assignment of the first network device 300 as a tunnel endpoint for destination 326 can be due to the proximity of the first network device 300 and the destination 326. Similarly, the assignment of the second network device 350 as a tunnel endpoint for destination 376 can be due to the proximity of the second network device 350 and the destination 376.

At 902, the network devices 300, 350 can receive tunnel endpoint configuration data. For example, the first network device 300 can receive from the NFO 152 for the LAN 105, first configuration data, such as the tunnel/destination/policy configuration 214A, to configure the first network device 300 to act as a first tunnel endpoint. The second network device 350 can receive from the NFO 152 for the LAN 105, second configuration data, e.g., the tunnel/destination/policy configuration 214B, to configure the second network device 350 to act as a second tunnel endpoint.

At 904, the network devices 300, 350 can apply the received tunnel endpoint configuration data. The first network device 300 can apply the first configuration data, i.e., the tunnel/destination/policy configuration 214A, to the first network device 300 to enable the first network device 300 to act as the first tunnel endpoint, and the second network device 350 can apply the second configuration data, i.e., tunnel/destination/policy configuration 214B, to the second network device 350 to enable the second network device 350 to act as the second tunnel endpoint.

At 906, 908, and 910, the first and second tunnel endpoints can receive and process network traffic via their respective tunnels. At 906, the first network device 300 can receive first network traffic 322 via first tunnels (e.g., first CAPWAP tunnels) from access points 115, 125, 135 of the LAN 105, wherein the first network traffic 322 is destined to a first destination 326 of multiple different destinations 326, 376. At 908 the first network device 300 can apply first policies to the first network traffic 322 received via the first tunnels. At 910, the first network device 300 can forward the first network traffic 322 to the first destination 326.

Similarly, at 906, the second network device 350 can receive second network traffic 372 via second tunnels (e.g., second CAPWAP tunnels) from access points 115, 125, 135 of the LAN 105, wherein the second network traffic 372 is destined to a second destination 376 of multiple different destinations 326, 376. At 908, the second network device 350 can apply second policies to the second network traffic 372 received via the second tunnels. At 910, the second network device 350 can forward the second network traffic 372 to the second destination 376.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:

monitoring network traffic communicated from client devices and through access points in a local area network, wherein the network traffic comprises multiple different destinations;

determining, based at least in part on the monitoring, the multiple different destinations;

receiving network topology data indicating a topology of network devices in the local area network;

determining, using the network topology data, a first network device within the local area network to serve as a first tunnel endpoint and a second network device within the local area network to serve as a second tunnel endpoint;

communicating with the first network device to configure the first network device to act as the first tunnel endpoint, wherein the first tunnel endpoint is adapted to:

receive first network traffic via first tunnels from the access points, wherein the first network traffic is of a first traffic type which is destined to a first destination of the multiple different destinations; and forward the first network traffic to the first destination;

communicating with the second network device to configure the second network device to act as the second tunnel endpoint, wherein the second tunnel endpoint is adapted to:

receive second traffic via second tunnels from the access points, wherein the second network traffic is of a second traffic type which is destined to a second destination of the multiple different destinations; and forward the second network traffic to the second destination;

providing the first network device with first policies to apply to the first network traffic received via the first tunnels; and providing the second network device with second policies to apply to the second network traffic received via the second tunnels.

2. The method of claim 1, wherein the determining, using the network topology data, the first network device within the local area network to serve as the first tunnel endpoint and the second network device within the local area network to serve as the second tunnel endpoint is based at least in part on first and second network distances, respectively, wherein the first network distance comprises a network distance between the first network device and the first destination, and wherein the second network distance comprises a network distance between the second network device and the second destination.

3. The method of claim 1, further comprising:

determining the first policies to apply to the first network traffic, wherein the first policies comprise a first portion of network policies applicable to the network traffic, wherein the first portion of the network policies is applicable to the first destination; and determining the second policies to apply to the second network traffic, wherein the second policies comprise a second portion of the network policies applicable to the network traffic, wherein the second portion of the network policies is applicable to the second destination.

4. The method of claim 1, wherein the first tunnels and the second tunnels comprise control and provisioning of wireless access points (CAPWAP) tunnels.

5. The method of claim 1, wherein the method is performed at a cloud location that is outside the local area network.

6. The method of claim 1, wherein;

the first destination is an authentication server, the first traffic type comprises authentication traffic, and the first tunnel endpoint is adapted to receive the first network traffic and forward the first network traffic to the authentication server; and the second destination is a dynamic host control protocol (DHCP) server, the second traffic type comprises DHCP traffic, and the second tunnel endpoint is adapted to receive the second network traffic and forward the second network traffic to the DHCP server.

7. The method of claim 1, wherein:

the first destination is a dynamic host control protocol (DHCP) server, the first traffic type comprises DHCP traffic, and the first tunnel endpoint is adapted to receive the first network traffic and forward the first network traffic to the DHCP server; and the second destination is a public internet destination, the second traffic type comprises public internet traffic, and the second tunnel endpoint is adapted to receive the second network traffic and forward the second network traffic to the public internet destination.

8. The method of claim 1, wherein the first destination is a private data center, wherein the first traffic type comprises private data center traffic, and wherein the first tunnel endpoint is adapted to receive the first network traffic and forward the first network traffic to the private data center.

9. A system comprising:

one or more processors; and one or more computer-readable media storing computer-executable instructions that, when executed by the one or more processors, cause the one or more processors to perform operations comprising:

monitoring network traffic communicated from client devices and through access points in a local area network, wherein the network traffic comprises multiple different destinations;

determining, based at least in part on the monitoring, the multiple different destinations;

receiving network topology data indicating a topology of network devices in the local area network;

determining, using the network topology data, a first network device within the local area network to serve as a first tunnel endpoint and a second network device within the local area network to serve as a second tunnel endpoint;

communicating with the first network device to configure the first network device to act as the first tunnel endpoint, wherein the first tunnel endpoint is adapted to:

receive first network traffic via first tunnels from the access points, wherein the first network traffic is of a first traffic type which is destined to a first destination of the multiple different destinations; and forward the first network traffic to the first destination;

communicating with the second network device to configure the second network device to act as the second tunnel endpoint, wherein the second tunnel endpoint is adapted to:

receive second traffic via second tunnels from the access points, wherein the second network traffic is of a second traffic type which is destined to a second destination of the multiple different destinations; and forward the second network traffic to the second destination;

providing the first network device with first policies to apply to the first network traffic received via the first tunnels; and providing the second network device with second policies to apply to the second network traffic received via the second tunnels.

10. The system of claim 9, wherein the determining, using the network topology data, the first network device within the local area network to serve as the first tunnel endpoint and the second network device within the local area network to serve as the second tunnel endpoint is based at least in part on first and second network distances, respectively, wherein the first network distance comprises a network distance between the first network device and the first destination, and wherein the second network distance comprises a network distance between the second network device and the second destination.

11. The system of claim 9, wherein the operations further comprise:

determining the first policies to apply to the first network traffic, wherein the first policies comprise a first portion of network policies applicable to the network traffic, wherein the first portion of the network policies is applicable to the first destination; and determining the second policies to apply to the second network traffic, wherein the second policies comprise a second portion of the network policies applicable to the network traffic, wherein the second portion of the network policies is applicable to the second destination.

12. The system of claim 9, wherein the first tunnels and the second tunnels comprise control and provisioning of wireless access points (CAPWAP) tunnels.

13. The system of claim 9, wherein the system is located at a cloud location that is outside the local area network.

14. The system of claim 9, wherein the first destination is an authentication server, wherein the first network traffic type comprises authentication traffic, and wherein the first tunnel endpoint is adapted to receive the first network traffic and forward the first network traffic to the authentication server.

15. The system of claim 9, wherein the first destination is a dynamic host control protocol (DHCP) server, wherein the first network traffic type comprises DHCP traffic, and wherein the first tunnel endpoint is adapted to receive the first network traffic and forward the first network traffic to the DHCP server.

16. The system of claim 9, wherein the first destination is a local destination within the local area network, wherein the first traffic type comprises local network traffic, and wherein the first tunnel endpoint is adapted to receive the first network traffic and forward the first network traffic to the local destination.

17. One or more non-transitory computer-readable media storing computer-executable instructions that, when executed by one or more processors, cause the one or more processors to perform operations comprising:

monitoring network traffic communicated from client devices and through access points in a local area network, wherein the network traffic comprises multiple different destinations;

determining, based at least in part on the monitoring, the multiple different destinations;

receiving network topology data indicating a topology of network devices in the local area network;

determining, using the network topology data, a first network device within the local area network to serve as a first tunnel endpoint and a second network device within the local area network to serve as a second tunnel endpoint;

communicating with the first network device to configure the first network device to act as the first tunnel endpoint, wherein the first tunnel endpoint is adapted to:

receive first network traffic via first tunnels from the access points, wherein the first network traffic is of a first traffic type which is destined to a first destination of the multiple different destinations; and forward the first network traffic to the first destination;

communicating with the second network device to configure the second network device to act as the second tunnel endpoint, wherein the second tunnel endpoint is adapted to:

receive second traffic via second tunnels from the access points, wherein the second network traffic is of a second traffic type which is destined to a second destination of the multiple different destinations; and forward the second network traffic to the second destination;

providing the first network device with first policies to apply to the first network traffic received via the first tunnels; and providing the second network device with second policies to apply to the second network traffic received via the second tunnels.

18. The one or more non-transitory computer-readable media of claim 17, wherein the determining, using the network topology data, the first network device within the local area network to serve as the first tunnel endpoint and the second network device within the local area network to serve as the second tunnel endpoint is based at least in part on first and second network distances, respectively, wherein the first network distance comprises a network distance between the first network device and the first destination, and wherein the second network distance comprises a network distance between the second network device and the second destination.

19. The one or more non-transitory computer-readable media of claim 17, wherein the operations further comprise:

determining the first policies to apply to the first network traffic, wherein the first policies comprise a first portion of network policies applicable to the network traffic, wherein the first portion of the network policies is applicable to the first destination.

20. The one or more non-transitory computer-readable media of claim 17, wherein the first tunnels and the second tunnels comprise control and provisioning of wireless access points (CAPWAP) tunnels.

* * * * *